United States Patent Office 2,707,939
Patented May 10, 1955

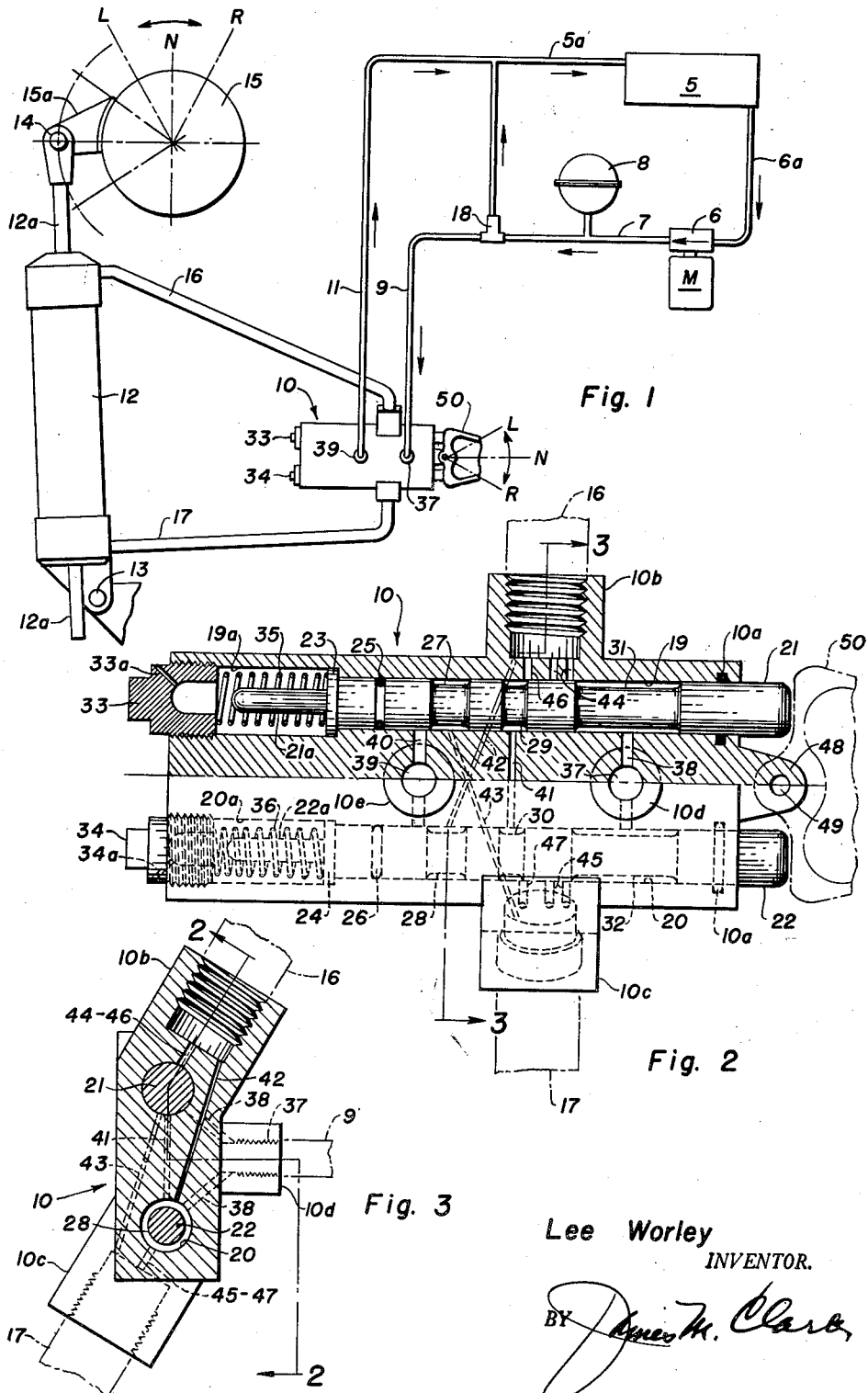

2,707,939

AIRCRAFT STEERING SYSTEM AND VALVE THEREFOR

Lee Worley, Hagerstown, Md., assignor to Fairchild Engine and Airplane Corporation, a corporation of Maryland Application November 27, 1953, Serial No. 394,708

5 Claims. (Cl. 121—46.5)

This invention relates in general to the power steering of aircraft and other vehicles and more particularly to an improved hydraulic steering system and its components.

The present invention is particularly adapted to the ground operation of aircraft in which, as in the case of other vehicles, power means for steering the aircraft over the ground is provided. In the case of large aircraft and those which are provided with tricycle type landing gears, the steering is usually accomplished either by turning the nose wheel, or in certain instances also applying the main wheel brakes on one side and the engine power on the other side in order to make the desired turn. It has accordingly been found desirable to provide most large aircraft with power steering systems, particularly of the hydraulic type which also lends itself readily to the inclusion of suitable shimmy dampening means to prevent undesired oscillations of the landing gear while the aircraft is travelling over the ground.

This invention is directed to an improved hydraulic steering system and more particularly to a steering control valve construction incorporating a shimmy damper feature for use in the power steering of the nose wheel of an airplane, or for the wheels of other vehicles. It has been found that failure of the mechanism in prior steer valves to prevent shimmy of the nose wheel is usually traceable to the maladjustment or poor fitting of the valve pistons or plungers commonly used in these valve devices. These plungers or valve pistons are usually spring-loaded and unless they are very accurately adjusted, the alignment of the piston with the shimmy orifices is likely to be sufficiently far off the proper position to prevent the desired damping function. The proper adjustment of these prior valves is extremely difficult, particularly when it is required to be done in the field, and their proper adjustment and servicing frequently requires very elaborate equipment. The improved steering control vavle of the present invention eliminates the possibility of improper functioning by being constructed initially such that it inherently does not require adjustment. Once the mechanism in the improved valve is properly constructed and assembled it will operate satisfactorily without the need of any adjustment or alignment, barring, of course, the breakage of parts which may be readily replaced by any mechanic in the field even under the most adverse conditions.

It is, accordingly, a primary object of the present invention to provide an improved power steering system, preferably of the fluid or hydraulic motor type which also combines in a simplified, efficient, and self-contained manner the feature of a dampening device to prevent undesired shimmy or oscillation of the landing gear units. It is a corollary objective to provide an improved power steering device for the nose wheel of a tricycle type aircraft landing gear. A further object resides in the provision of a steering system which includes automatic self-centering and piston-positioning means and which insures the operation of such means in the event of failure of the hydraulic actuating pressure. It is also a principal object of the present invention to provide a steering device which incorporates an improved shimmy dampening means which is inherently non-adjustable and therefore does not require adjustment in the field and is not subject to improper functioning in service. Other objects and advantages of the present invention will become obvious to those skilled in the art after reading the present description, considered in conjunction with the accompanying drawings, forming a part hereof, in which:

Fig. 1 is a schematic plan view showing a preferred embodiment of the improved steering system and its steering valve component in its neutral or centered position;

Fig. 2 is an enlarged partially cross-sectioned view of the improved steering valve shown in Fig. 1; and Fig. 3 is a cross-sectional view of the same as taken along the lines 3—3 of Fig. 2.

Referring now to Figure 1, the improved steering system comprises essentially a reservoir 5 which is supplied during the normal operation of the system through the return line 5a, the hydraulic fluid being drawn from the reservoir by the pump 6 driven by the motor M through the pump suction line 6a. The pump 6 delivers fluid at an elevated pressure which may preferably be of the nature of 650 p. s. i. or greater into the pressure line 7 which is open to the accumulator 8. The equipment described to this point may be conventional and is normally provided in the airplane for the hydraulic braking of the landing gear wheels. The fluid pressure to the wheel brake system may be drawn from the disclosed steering system by suitable conduits in an obvious manner which has not been illustrated in Fig. 1, or on the other had the hydraulic power for the wheel brakes may be supplied from a separate system. The hydraulic pressure from the pump 6 continues through the hydraulic pressure line 9 and through the improved balanced control valve 10 from which a return line 11 provides communication with the above-mentioned reservoir return line 5a. In order to protect the system from excessive pressures, a pressure relief valve 18 is provided in the high pressure line 7—9 to return fluid under excessive pressures directly to the return line 5a.

The steering mechanism may comprise essentially a hydraulic steering motor 12 which consists of a cylinder portion and a piston reciprocably centered therein by a pair of opposed springs of a conventional type which have not been further illustrated for this reason. A piston rod 12a fixed to the piston may preferably extend through both ends or heads of the cylinder portion to provide equal movement and power in each direction. This piston rod is pivotally connected at one end by the pivot 14 and the cylinder portion is pivotally mounted upon fixed structure as by the pivot 13. The wheel steering post or column is indicated at 15 and is provided with a laterally extending lug or ear 15a which is suitably apertured to provide the pivotal connection for the pivot pin 14 to the piston rod 12a. While for purposes of simplification, the wheel or other ground-engaging member has not been illustrated, it will be understood that the actuating mechanism is illustrated in the neutral position of the wheel corresponding to the construction line N and that as the system is operated the wheel may be rotated into positions corresponding either to the left position L or the right position R. The hydraulic fluid under pressure is carried and returned to the end portions of the cylinder of the fluid motor 12, on the opposite sides of the piston therein, by means of the flexible actuating fluid conduits 16 and 17 in communication with the steering control valve 10. As referred to above, the entire system is protected from excessive pressures by the relief valve 18.

Referring now to Figs. 2 and 3, showing the details of the improved steering control valve, the valve body or casing 10 may be of a single integral casing of substantially rectangular construction provided with integral apertured ports or bosses 10b, 10c, 10d and 10e. As will be brought out more fully in the further description below, the port 10b is suitably threaded to receive the connection to the conduit 16 and the opposite port 10c is also similarly threaded to provide the connection to the other conduit 17, which together with the conduit 16 extend to the ends of the fluid motor 12. The port 10d is suitably apertured and threaded to receive the pressure conduit 9, and the like port 10e is similarly apertured and threaded to provide connection to the return line 11.

The body of the valve 10 is provided with a pair of parallel longitudinally extending bores 19 and 20 within which are reciprocably slidable the valve pistons or plungers 21 and 22. Each of the bores 19 and 20 is provided with an enlarged diameter end portion 19a and 20a, respectively, and the pistons adjacent their opposite ends are sealed against the inner wall of each bore by the O-ring seals 10a. The valve piston 21 is provided with an enlarged diameter or shouldered portion 23 which is slidable within the enlarged bore 19a, and the piston 22 is similarly provided with an enlarged shouldered portion 24. The piston 21 is provided with a plurality of lands or land portions defining a number of grooves therebetween, the first groove of which provides an O-ring seal 25 adjacent the shouldered surface between the main and enlarged portions of the bore. The piston 22 has a corresponding O-ring seal 26 and the adjacent lands in each piston define the necked or recessed portion, both of which form the fluid chambers 27 and 28, respectively. Further land portions in each of the pistons 21 and 22 and the intervening reduced diameter portions define the chambers 29 and 30, respectively, as well as the main high pressure inlet chambers of somewhat greater axial length 31 and 32, respectively. The ends of each of the enlarged bore portions 19a and 20a are threaded to receive the end plugs 33 and 34 which are provided with the atmospheric vent passages 33a and 34a, respectively. The adjacent ends of each of the pistons 21 and 22 are provided with the integral pin portions 21a and 22a which extend into the recessed portions of the plugs 33 and 34 as the pistons are depressed against the compression springs 35 and 36 which are interposed between the plug 33 and the shoulder 23 in the case of the piston 21, and between the plug 34 and the shouldered portion 24 in the case of the piston 22.

The previously-referred-to boss 10d forms the high pressure inlet port 37, the axis of which is disposed normal to those of the pistons 21 and 22 and centrally between the piston bores. From the bottom of the threaded inlet port 37 in communication with the high pressure conduit 9, there is provided a pair of angularly disposed passages 38 which extend to each of the main bores 19 and 20 and provide fluid communication to the enlarged chambers 31 and 32, respectively, formed therein. Similarly the integral boss 10e forming the threaded fluid return port 39 connected to the return line 11 is also provided with a pair of angularly disposed fluid passages 40, each of which extends to the wall portions of the main bores 19 and 20 but are blocked off by the presence of the second land portions of the valve pistons in their normal centered or undepressed positions shown in Fig. 2.

Between the main piston bores 19 and 20, preferably in the plane of the axes thereof, and intermediate the ports 37 and 39 there is provided a transverse shimmy damping passage 41 which, in the normal centered position of the pistons 21 and 22, communicates with their corresponding chambers 29 and 30. A further fluid passage 42 extends from the interior of the port 10b, connected to the conduit 16 (from the motor 12), to the chamber 28 formed within the bore 20 by the piston 22; and a corresponding passage 43 similarly extends from the port 10c, connected to the conduit 17, to the chamber 27 formed within the bore 19 by the piston 21. Due to the angular disposition of the bosses 10b and 10c, the passageways 42 and 43 can be drilled directly without interference with the intervening bores, as may be readily seen in Fig. 3. Between the interior of the port 10b and the wall of the bore 19, there is also provided a pair of radially extending passages 44, both of which are sealed off by the fourth land of the piston 21 in its normal undepressed position. A further passage 46 extends from the port 10b, and, in the normal undepressed position of the piston 21, extends beyond the edge of the same land and provides fluid communication with the chamber 29 open to the shimmy dampening by-pass passage 41. In a similar manner the opposite port 10c is provided with a pair of radially extending passages 45 which are closed off in the centered position of the piston 22 and there is adjacently provided a further passage 47 which is partially open to and in communication with the chamber 30 within the bore 20 and therefore in communication with the same shimmy dampening by-pass passage 41.

The body of the valve 10 is provided with a tongue or lug portion 48 which is apertured for the transverse pivot 49 which mounts the rocking steer lever 50 whereby the latter may be controllably rocked or rotated from its neutral or centered position indicated by the letter N to the left and right positions L and R corresponding to the similarly lettered positions of the wheel steering post, either by manual or power actuation. It will be noted that as the lever 50 is rocked in either direction from the neutral position N its shouldered portions engage the exposed and projecting ends of either one of the valve pistons 21 or 22 causing the piston which is contacted to be moved to the left against the opposing force of its compression spring and also causing the enlarged plate portion of the piston to be moved from the shouldered portion formed in the bore of the valve.

It will be noted by reference to Fig. 2, that, in the neutral or central position shown, the high pressure fluid entering the port 10d through the inlet connection 37 passes inwardly and downwardly through the passages 38 and into the high pressure chambers 31 and 32. Each piston valve is designed and constructed, however, such that when its plate portion 23 or 24 is urged against the shouldered portion of the corresponding valve bore by its compression spring the fourth land portions between the chambers 29 and 31 in the case of the piston 21, and the chambers 30 and 32 in the case of the piston 22, each blocks off the first passages 44 and 45 respectively, thereby preventing high pressure fluid from reaching the fluid motor 12 through either of the flexible conduits 16 or 17. This corresponds to the condition shown in Fig. 2 in which neither piston is depressed and the wheel rotatably mounted upon the steering post 15 is hydraulically locked in the position to which it had been adjusted except for the relatively restricted metered flow which is capable of passing from conduit 16 to conduit 17, or vice versa, through the passages 46 and 47, the chambers 29 and 30, and the transverse passage or shimmy dampening by-pass 41. The flow of fluid from one end of the cylinder 12 to the other under this condition is such that it will arrest and dampen any oscillations which may be developed within the wheel tending to oscillate about the axis of the post 15. As in the case of the blocked high pressure flow from the port 37 and the chambers 31 and 32, the return flow through the passages 40 and the return port 39 is blocked by the second land portion of each of the valve pistons such that in the neutral position of the steering lever 50 the only flow permissible from one side of the motor piston 12 to the other is through the shimmy dampening passage 41. The latter damping flow may be controlled by the use of accurately drilled metering plugs threaded into the appropriate passages.

In the event the lever 50 is moved toward the left or L position, the end of the valve piston 21 is contacted and moved toward the left against the opposition of its compression spring 35. As the piston 21 moves to the left the fourth land portion cuts off the shimmy damping fluid flow through the passage 46 while at the same time uncovering a portion of the first of the high pressure passages 44 permitting high pressure from the inlet port 37 and the chamber 31 to pass through the first passage 44 and outwardly through the port 10b and the conduit 16 to the upper or forward side of the piston in the motor 12. This will thereby draw the piston rod 12a rearwardly and will rotate the post 15 from its neutral or centered position toward the left or L position. The same movement toward the left made by the piston valve 21 causes the second land portion thereof to uncover the passage 40 and to provide communication from the conduit 17 and the port 10c through the passageway 43 and the chamber 27 for the return flow of the fluid displaced by the piston within the actuating cylinder 12, thence outwardly of the valve through the port 39 and the return lines 11 and 5a to the reservoir.

Inasmuch as but one valve piston can be depressed or actuated at a time, the opposite piston 22 remains in its undepressed or normal position in which its port 10c is blocked off from the high pressure chamber 32 and the flow through its passage 47 is no longer effective for dampening purposes inasmuch as it is blocked off on the opposite side at 46. Similarly the passage 42 which is subjected to the flow of high pressure fluid from the port 10b carries the same to the chamber 28 of the undepressed piston which in its neutral position is not placed in communication with its passage 40 to the return port 39 and therefore all of the high pressure fluid is caused to pass through the conduit 16 for the actuation of the piston of the motor 12. The two parallel passages 44 are provided between the high pressure chamber 31 and the port 10b to provide gradual starting and stopping of the motor 12 and to allow greater fluid flow when increased steering power is required by the operator when the lever is moved sufficiently to further depress or displace the piston 21 to uncover the second passage 44. Obviously more than two passages could be provided or alternatively a single passage of other than circular cross-section could be used. When the nose wheel has been steered to the desired position, it can be held there by return of the lever 50 to its neutral position permitting the piston 21 to be returned to its neutral position under the influence of the spring 35, at which time it cuts off the pressure flow and the return flow while restoring the shimmy damping by-pass flow through the passage 41. In this condition, the wheel is hydraulically locked in its steered or adjusted position except for the metered flow through the restricted passage 41 to provide the desired shimmy damping.

It will, accordingly, be noted that whenever either valve piston is returned to its normal or neutral position under the influence of the respective compression spring the piston is automatically and positively positioned where it cuts off both the pressure and return flows and again restores the predetermined restricted metering flow to provide the desired shimmy effect in any of the adjusted positions of the wheel. This metering position of the valve piston is designed and built into the control valve and, not being subject to any adjustment means, is not capable of getting out of adjustment as long as the valve pistons are permitted to be returned to their normal limiting positions. It will also be obvious that the axes of the main bores 19 and 20 could be other than parallel as shown.

While the operation of the valve piston 21 only has been fully described, it will be understood that the operation of its corresponding counterpart 22 is identical when it is displaced and the same but opposite functions are initiated in the actuating motor 12 and the nose wheel is caused to be steered in the opposite direction. The pressure flow again passes from the line 9 through the inlet port 37, the return flow passes out from the outlet port 39 to the return line 11, and then flows within the respective flexible conduits 16 and 17 to the actuating motor being in the opposite direction to that when the first valve piston is displaced. It will, accordingly, be seen that the improved control valve provides for the proper steering, and the shimmy damping is initiated at those times only at which it is required; and that due to the arrangement and design of its parts the valve cannot get out of adjustment once it is assembled, and the parts cannot be assembled improperly.

It will be obvious to those skilled in the art after reading the foregoing description that the present improvement may take forms other than the preferred embodiment which has been shown and described for illustrative purposes only, and that such further embodiments are intended to come within the scope and spirit of the present invention as more particularly set forth in the appended claims.

I claim:

1. A hydraulic control valve comprising a body having a pair of bores, valve pistons slidably mounted in each of said bores, a pressure fluid inlet in communication with each said bore, a return fluid outlet in communication with each said bore, a pair of fluid ports in communication with each said bore, each said valve piston provided with a plurality of land portions arranged in the normal position of each valve piston to block off pressure and return fluid flow from said each bore, control means for slidably moving one of said valve pistons to a position in which pressure flow from the corresponding bore of said valve is permitted to enter into one of said actuating fluid ports and return flow from said other actuating fluid port is permitted to enter said return flow port, and metering means including a passage in said body extending between said bores placed in fluid communication with said fluid ports in the normal positions of both said valve pistons between corresponding land portions in said valve pistons, actuation of one of said valve pistons causing cut-off of said fluid communication between said fluid ports by the blocking effect of one of said land portions.

2. A hydraulic control valve comprising a casing having a pair of main bores, valve pistons reciprocably mounted in each of said bores, a pressure fluid inlet in communication with each said bore, a return fluid outlet in communicatiin with each said bore, a pair of actuating fluid ports in communication with each said bore, each said valve piston provided with a plurality of land portions arranged in the normal position of each valve piston to block off pressure and return fluid flow from said each bore, positioning means cooperatively carried by each said valve piston arranged to return said pistons to said normal positions, control means for slidably moving one of said valve pistons into a position in which pressure flow from the corresponding bore of said valve is permitted to enter into one of said actuating fluid ports and return flow from said other actuating fluid port is permitted to enter said return flow port, and metering means including a passage in said body extending between said bores placed in fluid communication with said fluid ports in the normal pistons of both said valve pistons between corresponding land portions in said valve pistons, actuation of one of said valve pistons causing cut-off of said fluid communication between said fluid ports by the blocking effect of one of said land portions.

3. A hydraulic control valve comprising a casing having a pair of main bores, spring-biased valve pistons reciprocably mounted in each of said bores, a pressure fluid inlet in communication with each said bore and a source of fluid pressure, a return fluid outlet in communication with each said bore, a pair of actuating fluid ports each in communication with each said bore, each said main bore having a shouldered portion against which its spring-biased piston is moved in its normal position, each said valve piston provided with a plurality of land portions arranged in the normal position of each valve piston to block off pressure and return flow from said each bore, control means for slidably moving one of said valve pistons into a position in which pressure flow from the corresponding bore of said valve is permitted to enter into one of said actuating fluid ports and return flow from said other actuating fluid port is permitted to enter said return flow port, and metering means including a passage in said body extending between said bores placed in fluid communication with said fluid ports in the normal positions of both said valve pistons between corresponding land portions in said valve pistons, actuation of one of said valve pistons causing cut-off of said fluid communication between said fluid ports by the blocking effect of one of said land portions.

4. In a steering system for a vehicle including a component mounted for steering movements, a hydraulic motor pivotally mounted upon the vehicle and operatively connected to said component, and a source of fluid pressure, the improvement comprising a steering control valve having a pair of main bores, valve pistons slidably mounted in each said bore, said source of hydraulic pressure in fluid communication with each said bore, each said valve piston provided with a plurality of land portions defining fluid spaces, said land portions arranged in the normal position of each said valve piston to block off pressure and return flow from each said bore, fluid conduits connecting each said bore of said control valve with said hydraulic motor, control means operatively mounted upon said valve for sliding one or the other of said valve pistons for controlled flow of said hydraulic pressure fluid to said hydraulic motor for steering movement of said component, means insuring the return of said slidably actuated valve pistons to their normal positions, and a fluid passage in said control valve interconnecting said bores and placed by certain of said fluid spaces of said valve pistons in their normal positions in communication with said fluid conduits to said hydraulic motor for metering fluid flow from one end of said hydraulic motor to the other to dampen oscillations of said steerable component.

5. A hydraulic control valve comprising a body having a pair of cylindrical bores, a valve piston slidably mounted in each said respective bore, said valve pistons each having a plurality of land portions defining fluid spaces, said body having a pressure inlet in fluid communication with pressure spaces defined by adjacent pairs of land portions of said respective valve pistons, said body having a return port in fluid communication with return spaces defined by adjacent pairs of land portions of said respective valve pistons, said body having a first actuating port, said body having a second actuating port, metering means including a restricted passage formed in said body and a by-pass space defined by further pairs of adjacent land portions in said respective valve pistons placing said first and said second actuating ports in fluid communication in the normal positions of said valve pistons, a return passage formed within said body in communication with one of the said return spaces defined by the land portions of a first of said valve pistons and with the second said actuating port arranged such that sliding movement of the first said valve piston from said normal position places said pressure inlet in communication with said first actuating port through said pressure space defined by the first said valve piston, placement of said return space defined by the said first valve piston with said second actuating port through said return passage and cut-off of said restricted metering passage between said first and said second actuating ports by a land portion of said first valve piston.

References Cited in the file of this patent

UNITED STATES PATENTS

| | | |
|---|---|---|
| 965,270 | Zelle | July 26, 1910 |
| 1,083,810 | Engberg | Jan. 6, 1914 |
| 2,383,773 | Chisholm, Jr. | Aug. 28, 1945 |
| 2,387,896 | Giger | Oct. 30, 1945 |
| 2,396,993 | Fawkes | Mar. 19, 1946 |